United States Patent
Tsuchiya et al.

(10) Patent No.: US 10,711,134 B2
(45) Date of Patent: Jul. 14, 2020

(54) LIQUID CRYSTAL POLYESTER RESIN COMPOSITION

(71) Applicant: UENO FINE CHEMICALS INDUSTRY, LTD., Osaka-shi, Osaka (JP)

(72) Inventors: Hitoshi Tsuchiya, Sanda (JP); Hiroto Uchida, Sanda (JP); Masahiro Kihara, Sanda (JP); Masahiro Fukazawa, Sanda (JP); Kenta Osugi, Kobe (JP)

(73) Assignee: UENO FINE CHEMICALS INDUSTRY, LTD., Osaka (JP)

( * ) Notice: Subject to any disclaimer, the term of this patent is extended or adjusted under 35 U.S.C. 154(b) by 25 days.

(21) Appl. No.: 16/161,195

(22) Filed: Oct. 16, 2018

(65) Prior Publication Data

US 2019/0112473 A1    Apr. 18, 2019

(30) Foreign Application Priority Data

Oct. 18, 2017    (JP) ................. 2017-202083

(51) Int. Cl.
| C08L 67/00 | (2006.01) |
| C08L 67/04 | (2006.01) |
| H01B 3/42 | (2006.01) |
| H01R 12/88 | (2011.01) |
| H01R 12/77 | (2011.01) |

(52) U.S. Cl.
CPC ............ *C08L 67/04* (2013.01); *C08L 67/00* (2013.01); *H01B 3/423* (2013.01); *C08L 2205/025* (2013.01); *C08L 2205/03* (2013.01); *C08L 2205/12* (2013.01); *H01R 12/771* (2013.01); *H01R 12/88* (2013.01)

(58) Field of Classification Search
CPC ......... C08L 67/04; C08L 67/00; H01B 3/243; C08K 5/34924; C08K 7/14; C08K 3/22; C09K 19/54; C08G 63/065; C08G 63/605
USPC .......................................... 523/217; 524/605
See application file for complete search history.

(56) References Cited

U.S. PATENT DOCUMENTS

| 6,346,568 | B1 * | 2/2002 | Maeda | .............. | C08K 9/08 524/495 |
| 7,824,572 | B2 * | 11/2010 | Okamoto | ............. | C08G 63/605 252/299.01 |
| 8,066,907 | B2 | 11/2011 | Kohinata et al. | | |
| 10,125,240 | B2 * | 11/2018 | Tsuchiya | .............. | C08G 63/065 |
| 10,377,851 | B2 * | 8/2019 | Ishizu | ................ | C08L 67/00 |
| 2011/0073807 | A1 | 3/2011 | Kohinata et al. | | |
| 2012/0135228 | A1 * | 5/2012 | Fukuhara | ............. | C08L 67/00 428/339 |
| 2017/0283586 | A1 * | 10/2017 | Tsuchiya | ............. | C08G 63/065 |
| 2019/0062494 | A1 * | 2/2019 | Takasuka | ............. | C08G 63/605 |
| 2019/0233582 | A1 * | 8/2019 | Tsuchiya | ............. | C08L 67/03 |

FOREIGN PATENT DOCUMENTS

| JP | 2007138143 A | 6/2007 |
| JP | 2011094116 A | 5/2011 |

* cited by examiner

*Primary Examiner* — Hannah J Pak
(74) *Attorney, Agent, or Firm* — Sughrue Mion, PLLC

(57) ABSTRACT

A liquid crystal polyester resin composition includes a liquid crystal polyester (A) including repeating units represented by formulae (I) to (III),

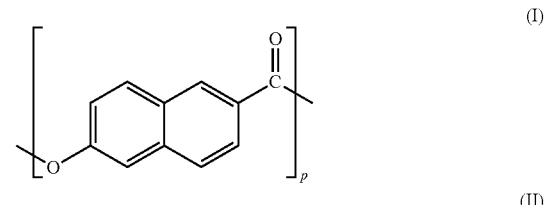

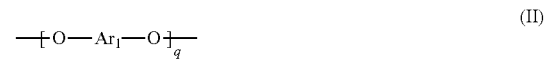

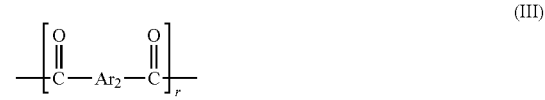

a liquid crystal polyester (B) including repeating units represented by formulae (IV) and (V),

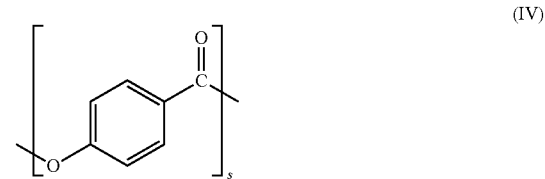

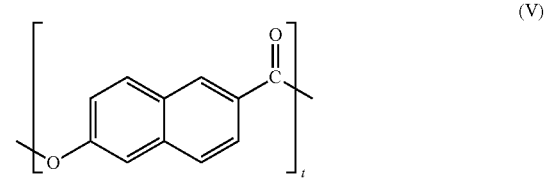

and surface-treated glass fibers (C) including an epoxy resin on the surface thereof, wherein the mass ratio of (A) to (B) [A/B] is from 90/10 to 45/55, the content of (C) is from 10 to 130 parts by mass relative to 100 parts by mass of the total amount of (A) and (B), and as measured in a bending test using a strip-like molded article (length: 127 mm, width: 12.7 mm, thickness: 0.5 mm), the bending strength and the bending elastic modulus of the liquid crystal polyester resin composition are equal to or more than 330 MPa and equal to or more than 20 GPa, respectively.

6 Claims, 1 Drawing Sheet

LIQUID CRYSTAL POLYESTER RESIN COMPOSITION

FIELD OF THE INVENTION

This patent application claims priority under the Paris Convention based on Japanese Patent Application No. 2017-202083 (filed Oct. 18, 2017), which is incorporated herein by reference in their entirety. The present invention relates to a liquid crystal polyester resin composition having high rigidity and high strength.

BACKGROUND ART

Liquid crystal polyesters are excellent, in flowability and resistance to burr formation, and also excellent in heat resistance, mechanical properties such as rigidity, chemical resistance, dimensional precision and the like. Therefore, the liquid crystal polyesters are increasingly used for electrical and electronic components having complex shapes. In particular, the liquid crystal polyesters are often used for connectors due to requirements for high performance electrical and electronic devices, such as requirements relating to mountability (reflow resistance, i.e. resistance to heat during reflow soldering), and high-density mounting and downsizing (flowability and resistance to burr formation).

Further height-reducing and downsizing in connectors are progressing in recent years, and thus higher performance is required for resin materials from which the connectors are made. This trend is notable for FPC or FFC connectors used for connecting a printed circuit board and a flexible printed circuit (FPC), or a flexible flat cable (FFC), for example.

The FPC or FFC connector is composed of a housing component (part) and an actuator component (part), both of which have a wide width. The housing supports the actuator component rotatably between a locked position and an unlocked position. The actuator component when fixed in the locked position applies contact pressure to the FPC or FFC inserted in an insertion opening.

In this fixation, the actuator component is desirably fixed by applying a pressure force to only one end of the actuator component. Thus, when the rigidity of the resin material is not sufficient, problems such as breakage of the actuator component and insufficient fixation of the FPC or FFC occur. Thus, there is a need for an actuator component composed of a highly rigid resin material.

There are some resin materials proposed as a highly rigid liquid crystal polyester resin composition, including a resin composition obtained by blending a liquid crystal polyester with silica fine particles (Patent Document 1) and a resin composition blended with mica and a specific carbon fiber (Patent Document 2).

However, improvement in rigidity provided by these resin compositions is not sufficient, and these resin compositions are inferior in followability and mechanical strength.

Generally, it was believed that rigidity conflicts to strength in liquid crystal polyester resin compositions, and thus providing the liquid crystal polyester resin composition excellent in both rigidity and strength in a balanced manner is difficult.

Patent Document 1: Japanese Patent Publication No. 2007-138143
Patent Document 2: Japanese Patent Publication No. 2011-094116

SUMMARY OF THE INVENTION

An object of the present invention is to provide a liquid crystal polyester resin composition well-balanced between high rigidity and high strength, and a molded article composed of the liquid crystal polyester resin composition.

As a result of intensive studies about rigidity and strength of liquid crystal polyester resins in terms of the above described problem, the inventors found that a liquid crystal polyester resin composition having improved bending elastic modulus and bending strength can be obtained by blending two kinds of liquid crystal polyesters, each including particular repeating units, and mixing the blend and a particular glass fiber, whereby the present invention was achieved.

Accordingly, the present invention provides a liquid crystal polyester resin composition, comprising:
a liquid crystal polyester (A) including repeating units represented by formulae (I) to (III),

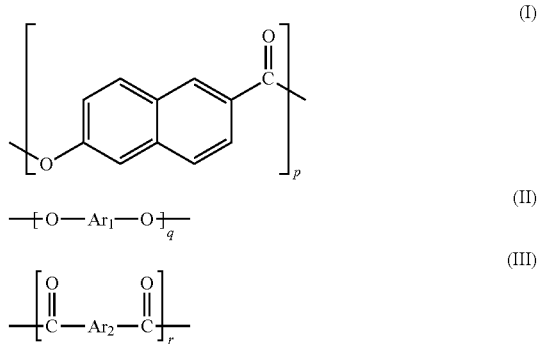

wherein
each of $Ar_1$ and $Ar_2$ represents one or more divalent aromatic groups, and p, q, and r are molar percentages of the respective repeating units in the liquid crystal polyester (A) and satisfy the following condition, $35 \leq p \leq 90$, $5 \leq q \leq 30$, and $5 \leq r \leq 30$, a liquid crystal polyester (B) including repeating units represented by formulae (IV) and (V),

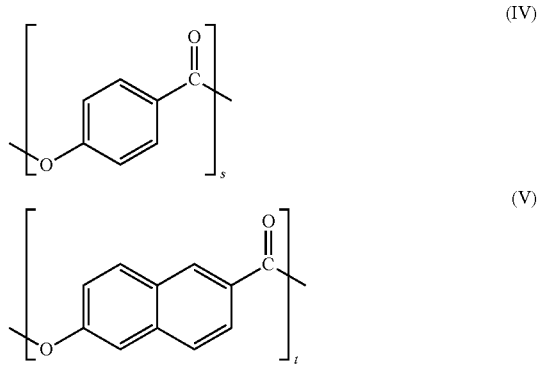

wherein
s and t are molar percentages of the respective repeating units in the liquid crystal polyester (B) and satisfy the following condition, $80/20 \leq s/t \leq 60/40$, and surface-treated glass fibers (C) including an epoxy resin on the surface thereof, wherein the mass ratio of (A) to (B) [A/B] is from 90/10 to 45/55, the content of (C) is from 10 to 130 parts by mass relative to 100 parts by mass of the total amount of (A) and (B), and as measured in a bending test using a strip-like molded article (length: 127 mm, width: 12.7 mm, thickness: 0.5 mm), the bending strength and the bending elastic modulus of the liquid crystal polyester resin composition are equal to or more than 330 MPa and equal to or more than 20 GPa, respectively.

The liquid crystal polyester resin composition of the present invention is excellent in bending elastic modulus and bending strength, and thus suitable for use in electrical and electronic component applications, such as housings and packages for various communication devices, electronic devices, and the like, for example, actuator components for FPC and FFC connectors.

EMBODIMENTS OF THE INVENTION

Figure 1:
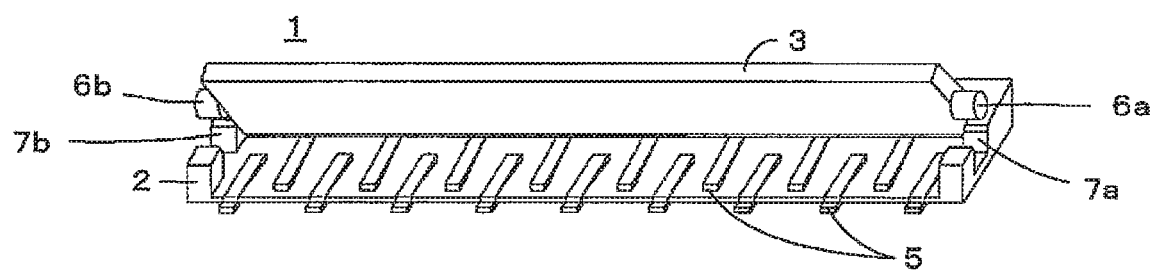
FIG. 1 shows a schematic diagram illustrating a test piece used in a confirmation test for fixation of an actuator component, with the actuator component in ail unlocked position.

A liquid crystal polyester (A) and a liquid crystal polyester (B) used in a liquid crystal polyester resin composition of the present invention is a liquid crystal polyester which forms an anisotropic molten phase, and such a liquid crystal polyester is called thermotropic liquid crystal polyester by those skilled in the art.

The properties of the anisotropic molten phase of the liquid crystal polyester can be observed by a common polarization examination utilizing crossed polarizers (i.e., an examination in which a sample mounted on a hot stage is observed in a nitrogen atmosphere).

The liquid crystal polyester (A) will be described below.

A liquid crystal polyester including repeating units represented by formulae (I) to (III) is used as the liquid crystal polyester (A) used in the present invention,

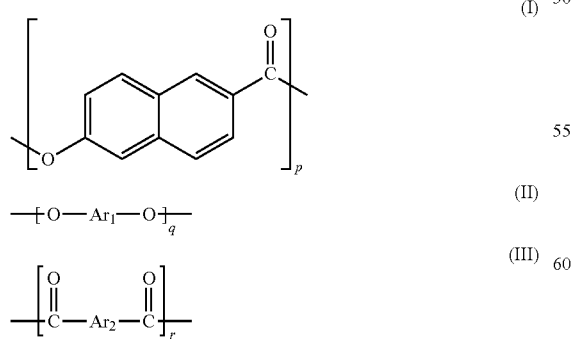

wherein, each of $Ar_1$ and $Ar_2$ represents one or more divalent aromatic groups, and p, q, and r are molar percentages of the respective repeating units in the liquid crystal polyester (A) and satisfy the following condition, $35 \leq p \leq 90$, $5 \leq q \leq 30$, and $5 \leq r \leq 30$.

The molar percentage p of formula (I) is preferably from 40 to 85% by mol, more preferably from 45 to 80% by mol, and still more preferably from 50 to 65% by mol.

The molar percentage q of formula (II) and the molar percentage r of formula (III) are each preferably from 7.5 to 30% by mol, more preferably from 10 to 27.5% by mol, and still more preferably from 17.5 to 25% by mol. It is preferable that the molar percentage q is equal to the molar percentage r.

For the above described repeating units, for example, the phrase "$Ar_1$ (or $Ar_2$) represents two or more divalent aromatic groups" means that, in accordance with the kinds of the divalent aromatic groups, two or more kinds of repeating units represented by formula (II) (or (III)) are included in the liquid crystal polyester. In this context, the molar percentage q of formula (II) (or the molar percentage r of formula (III)) represents a total molar percentage of the two or more kinds of repeating units.

Specific examples of a monomer forming the repeating unit represented by formula (I) include 6-hydroxy-2-naphthoic acid and ester-forming derivatives thereof, such as acylated products, ester derivatives, and acid halides of 6-hydroxy-2-naphthoic acid.

Specific examples of monomers for forming repeating units represented by formula (II) include, for example, aromatic diols such as hydroquinone, resorcin, 2,6-dihydroxynaphthalene, 2,7-dihydroxynaphthalene, 1,6-dihydroxynaphthalene, 1,4-dihydroxynaphthalene, 4,4'-dihydroxybiphenyl, 3,3'-dihydroxybiphenyl, 3,4'-dihydroxybiphenyl, 4,4'-dihydroxybiphenyl ether, and alkyl-, alkoxy-, or halogen-substituted products thereof, as well as ester-forming derivatives such as acylated products of these compounds.

Specific examples of monomers for forming repeating units represented by formula (III) include, for example, aromatic dicarboxylic acids such as terephthalic acid, isophthalic acid, 2,6-naphthalenedicarboxylic acid, 1,6-naphthalenedicarboxylic acid, 2,7-naphthalenedicarboxylic acid, 1,4-naphthalenedicarboxylic acid, 4,4'-dicarboxybiphenyl, and alkyl-, alkoxy-, or halogen-substituted products thereof, as well as ester-forming derivatives such as ester derivatives and acid halides of these compounds.

Among those, the liquid crystal polyester (A) is preferably a liquid crystal polyester (A) in which $Ar_1$ and $Ar_2$ in the repeating units represented by formula (II) and formula (III) each independently include one or more selected from the group consisting of aromatic groups represented by formulae (1) to (4).

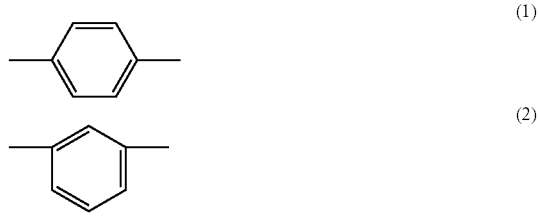

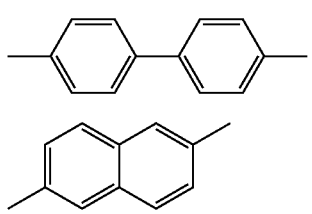

(3)

(4)

Among those, the aromatic groups represented by formulae (1) and (3) are more preferable for the repeating units represented by formula (II), in order to easily control, to appropriate levels, reactive properties upon polymerization as well as the mechanical properties, the heat, resistance, the crystal melting temperature, and the molding processability of the resulting liquid crystal polyester (A). Examples of monomers for forming these repeating units include 4,4'-dihydroxybiphenyl and hydroquinone, and ester-forming derivatives thereof.

Further, the aromatic groups represented by formula (1) are more preferable for the repeating units represented by formula (III), in order to easily control, to appropriate levels, the mechanical properties, the heat resistance, the crystal melting temperature, and the molding processability of the resulting liquid crystal polyester (A). Examples of monomers for forming these repeating units include terephthalic acid and ester-forming derivatives thereof.

Further, in the liquid crystal polyester (A) especially preferable to be used, the repeating units represented by formula (II) includes at least two of repeating units relating to formulae (1) and (3), and repeating units relating to formula (1) are preferably included in an amount of 80 to 99.9% by mol, more preferably 85 to 99% by mol, and still more preferably 90 to 98% by mol based on the total of repeating units represented by formula (III).

In the liquid crystal polyester (A) of the present invention, the total of the molar percentages of the repeating units [p+q+r] is preferably 100% by mol, while other repeating units may also be included without impairing the intent of the present invention.

Examples of monomers for forming other repeating units include other aromatic hydroxycarboxylic acids, aromatic hydroxyamines, aromatic diamines, aromatic aminocarboxylic acids, aromatic hydroxydicarboxylic acids, aliphatic diols, aliphatic dicarboxylic acids, aromatic mercaptocarboxylic acids, aromatic dithiols, aromatic mercaptophenols, and any combinations thereof.

Specific examples of other aromatic hydroxycarboxylic acids include, for example, 4-hydroxybenzoic acid, 3-hydroxybenzoic acid, 2-hydroxybenzoic acid, 5-hydroxy-2-naphthoic acid, 3-hydroxy-2-naphthoicacid, 4'-hydroxyphenyl-4-benzoic acid, 3'-hydroxyphenyl-4-benzoic acid, 4'-hydroxyphenyl-3-benzoic acid, and alkyl-, alkoxy-, or halogen-substituted products thereof, as well as ester-forming derivatives such as acylated products, ester derivatives, and acid halides of these compounds.

The total of the molar percentages of the repeating units derived from these other monomer components is preferably equal to or less than 10% by mol based on the total repeating units.

The crystal melting temperature of the liquid crystal polyester (A) used in the present invention is preferably from 310 to 360° C., but not especially limited thereto.

It is noted that "crystal melting temperature" in this specification and the appended claims is derived from a crystal melting peak temperature at a heating rate of 20° C./min measured by using a differential scanning calorimeter (hereafter, abbreviated as DSC). More specifically, a sample of the liquid crystal polyester is heated from room, temperature to determine the endothermic peak temperature (Tm1) measured under a heating condition of 20° C./min. After the Tm1 is determined, the sample is held at temperature 20 to 50° C. higher than Tm1 for 10 minutes, and then cooled to room temperature under a cooling condition of 20° C./min. Then again, the endothermic peak of the sample is determined under a heating condition of 20° C./min, and the temperature indicated by the peak top is defined as the crystal melting temperature of the liquid crystal polyester. An example of the measuring equipment that may be used for the measurement is Exstar 6000 (Seiko Instruments Inc.).

The melt viscosity of the liquid crystal polyester (A) used in the present, invention is preferably from 1 to 1000 Pa·s, and more preferably from 5 to 300 Pa·s, as measured on a capillary rheometer (CAPILOGRAPH ID manufactured by Toyo Seiki Seisaku-sho, Ltd.) by using a 0.7 mm$\phi$×10 mm capillary under a shear rate condition of 1000 s$^{-1}$ at the crystal melting temperature+30° C.

Next, the liquid crystal polyester (B) will be described.

A liquid crystal polyester including repeating units represented by formulae (IV) and (V) is used as the liquid crystal polyester (B) used in the present invention,

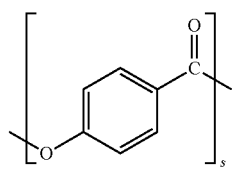

(IV)

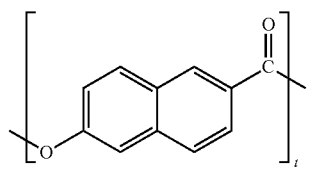

(V)

wherein s and t are molar percentages of the respective repeating units in the liquid crystal polyester (B) and satisfy the following condition, $$80/20 \leq s/t \leq 60/40.$$

The molar ratio of repeating units represented by formula (IV) to repeating units represented by formula (V) [s/t] in the liquid crystal polyester (B) is from 80/20 to 60/40, and preferably from 75/25 to 70/30.

Specific examples of monomers for forming repeating units represented by formula (IV) relating to the liquid crystal polyester (B) include 4-hydroxybenzoic acid, and ester-forming derivatives such as acylated products, ester derivatives, and acid halides of 4-hydroxybenzoic acid.

Specific examples of monomers for forming repeating units represented by formula (V) relating to the liquid crystal polyester (B) include 6-hydroxy-2-naphthoic acid, and ester-forming derivatives such as acylated products, ester derivatives, and acid halides of 6-hydroxy-2-naphthoic acid.

In the liquid crystal polyester (B), the total of the molar percentages of the repeating units [s+t] is preferably 100% by mol, while other repeating units may also be included without impairing the intent of the present invention.

Examples of monomers for forming other repeating units forming the liquid crystal polyester (B) include other aromatic hydroxycarboxylic acids, aromatic diol, aromatic dicarboxylic acids or aromatic hydroxydicarboxylic acids, aromatic hydroxyamines, aromatic diamines, aromatic aminocarboxylic acids, aromatic mercaptocarboxylic acids, aromatic dithiols, aromatic mercaptophenols and any combinations thereof.

Specific examples of other aromatic hydroxycarboxylic acids include, for example, 3-hydroxybenzoic acid, 2-hydroxybenzoic acid, 5-hydroxy-2-naphthoic acid, 3-hydroxy-2-naphthoic acid, 4'-hydroxyphenyl-4-benzoic acid, 3'-hydroxyphenyl-4-benzoic acid, 4'-hydroxyphenyl-3-benzoic acid, and alkyl-, alkoxy-, or halogen-substituted products thereof, as well as ester-forming derivatives such as acylated products, ester derivatives, and acid halides of these compounds.

Specific examples of aromatic diols, which are monomers for forming other repeating units, are the same as those listed as the monomers for forming repeating units of formula (II).

Specific examples of aromatic dicarboxylic acids, which are monomers for forming other repeating units, are the same as those listed as the monomers for forming repeating units of formula (III).

The total of the molar percentages of the repeating units derived from these other monomer components is preferably equal, to or less than 10% by mol based on the total repeating units, The crystal melting temperature of the liquid crystal polyester (B) used in the present invention is preferably from 250 to 300° C., for example, but not especially limited thereto.

The melt viscosity of the liquid crystal polyester (B) used in the present invention is preferably from 1 to 1000 Pa·s, and more preferably from 5 to 300 Pa·s, as measured on a capillary rheometer (CAPILOGRAPH ID manufactured by Toyo Seiki Seisaku-sho, Ltd.) by using a 0.7 mm$\phi$×10 mm capillary under a shear rate condition of 1000 s$^{-1}$ at the crystal melting temperature+40° C.

A production method, of the liquid crystal polyester (A) and the liquid crystal polyester (B) will be described below.

The production method of the liquid crystal polyester (A) and the liquid crystal polyester (B) used in the present invention is not especially limited, and the liquid crystal polyester (A) and the liquid crystal polyester (B) may be produced by using known polycondensation methods for forming ester bonds or the like from combinations of the above described monomers, such as a melt acidolysis method and a slurry polymerization method.

The melt acidolysis method is a method suitable for producing the liquid crystal polyester used in the present invention. According to the melt acidolysis method, firstly a monomer is heated to form a molten liquid of the reactant, and then the reactant is continuously reacted to form a molten polyester. It is noted that vacuum may be applied to promote removal of volatile components (such as acetic acid and water) which are byproducts at final stage of the condensation.

In the slurry polymerization method, the reaction is performed under the existence of a heat exchange fluid, and the resulting solid product is obtained in a suspended state in the heat exchange medium.

In both melt acidolysis method and slurry polymerization method, a polymerizable monomer component to be used for producing the liquid crystal polyester may be modified by acylating hydroxy groups at normal temperature, and the modified product (i.e., lower acylated product) may be provided to the reaction. The lower acyl group has preferably from 2 to 5 carbon atoms, and more preferably 2 or 3 carbon atoms. Especially preferably, an acetylated product of the above described monomer components is used in the reaction.

The lower acylated product of the monomer may be synthesized in advance in a separate acylation step, or produced in the reaction system by adding an acylating agent such as acetic anhydride into the monomer upon production of the liquid crystal polyester.

In both melt acidolysis method and slurry polymerization method, a catalyst may be used during the reaction if necessary.

Specific examples of the catalyst include, for example, organic tin compounds (for example, dialkyltin oxides such as dibutyltin oxide, and diaryltin oxides), organic titanium compounds (such as titanium dioxide, antimony trioxide, alkoxytitanium silicates, and titanium alkoxides), alkali metal salts and alkaline-earth metal salts of carboxylic acids (for example, potassium acetate and sodium acetate), Lewis acids (for example, BF3), and gaseous acid catalysts such as hydrogen halides (for example, HCl).

The use amount of the catalyst is preferably from 10 to 1000 ppm, and more preferably from 20 to 200 ppm based on the mass of monomers.

The liquid crystal polyester resulting from the polycondensation is removed in a molten state from a reaction tank, processed into a pellet form, flake form, or powder form, and then subjected to a molding process or melt-kneading.

The liquid crystal polyester in pellet form, flake form, or powder form may be heat-treated substantially in the state of the solid phase under reduced pressure, in vacuum, or in inert gas atmosphere such as nitrogen or helium atmosphere, for the purpose of increasing the molecular weight of the liquid crystal polyester to improve heat resistance.

The resulting liquid crystal polyester (A) and liquid crystal polyester (B) processed into pellet form, flake form, or powder form may be melt-kneaded by using a banbury mixer, a kneader, a single-screw or a twin-screw extruder, or the like, to form the liquid crystal polyester resin composition of the present invention.

The mass ratio of the liquid crystal polyester (A) to the liquid crystal polyester (B) [A/B] is from 90/10 to 45/55, and preferably from 85/15 to 75/25.

[A/B] of more than 90/10 results in insufficient improvement in bending strength of the liquid crystal polyester resin composition, while [A/B] of less than 45/55 results in lower heat resistance and insufficient bending elastic modulus of the liquid crystal polyester resin composition.

The mass ratio of the liquid crystal polyester (A) to the liquid crystal polyester (B) may be adjusted in advance when a melt-blended resin of the liquid crystal polyesters (A) and (B) is formed by melt-kneading or the like. Alternatively, the mass ratio of the liquid crystal polyester (A) to the liquid crystal polyester (B) may be adjusted when (A) and (B) are separately or simultaneously blended with glass fibers (C) to form, the liquid crystal polyester resin composition.

The surface-treated glass fibers (C) including an epoxy resin on the surface thereof used in the present invention are coated and bound by an epoxy resin. Other examples of the resin material for coating and sizing include urethane resins, epoxy urethane resins, and the like. However, glass fibers treated by epoxy resin are used herein, because it is excellent in wettability to the liquid crystal, polyester, and thus provides high rigidity and high strength. Further, the surfaces of glass fibers may be treated by a silane-based coupling agent and the like to improve adherence of the resin material for coating and sizing to the surface of the glass fibers.

The number average fiber length of the glass fiber (C) used in the present invention, when in a resin composition, is preferably from 100 to 600 µm and more preferably from 150 to 450 µm. The number average fiber length of less than 100 µm may result in inferior rigidity and strength, while the number average fiber length of more than 600 µm may result in lower flowability. The glass fibers (C) are typically broken or fragmented when blended with the liquid crystal polyesters, etc., and shortened to the above specified number average fiber-length in the liquid crystal polyester resin composition. In the production of the liquid crystal polyester resin composition of the present invention, glass fibers having a number average fiber length longer than the above specified number average fiber length in the liquid crystal polyester resin composition (for example, glass fibers having a number average fiber length of 1 to 10 mm) may be used.

The number average fiber diameter of the glass fiber (C) used in the present invention is from 5 to 15 µm, preferably from 6 to 12 µm. The number average fiber diameter of less than 5 µm may result in inferior rigidity and strength.

It is noted that the number average fiber diameter and the number average fiber length of the glass fiber are determined by observation using a microscope. Firstly, 1.0 g of the liquid crystal polyester resin composition is taken into a crucible and subjected to an ashing process in an electric furnace at 500° C. for 5 hours. Then the residue is dispersed in methanol, and then the dispersion is spread on a slide glass and used as a sample. Subsequently, the fiber length and the fiber diameter of the glass fibers are read in projected images of glass fibers in a microscopic field (herein, the fiber length is a longitudinal length of a glass fiber, and the fiber diameter is a length perpendicular to the longitudinal direction), and the arithmetic means of the fiber length and the fiber diameter are calculated. These average values are calculated based on 200 or more measured data.

The content of the glass fiber (C) in the liquid crystal polyester resin composition of the present invention is from 10 to 130 parts by mass, preferably from 20 to 100 parts by mass, and more preferably from 30 to 60 parts by mass, relative to 100 parts by mass of the total amount of the liquid crystal polyester (A) and the liquid crystal polyester (B).

The content of the glass fiber (C) of less than 10 parts by mass may result in lower rigidity and strength of the liquid crystal polyester resin composition. On the other hand, the content of the glass fiber (C) of more than 130 parts by mass results in lower molding processability or greater amount of wear on a cylinder or a mold of a molding machine.

Further, the liquid crystal polyester resin composition of the present invention may include, for example, another fibrous, plate-like, or granular inorganic filler or organic filler in addition to the above described glass fibers (C), without impairing the intent of the present invention. Preferably, the only filler included in the liquid crystal polyester resin composition of the present invention is the glass fiber (C).

Examples of other fibrous fillers include milled glasses, silica alumina fibers, alumina fibers, carbon fibers, aramid fibers, polyarylate fibers, polybenzimidazole fibers, potassium titanate whisker, aluminium borate whisker, wollastonite, and these fillers may be used alone or two or more of these fillers may be used together.

Examples of other plate-like fillers include silicates such as talc, mica, kaoline, clay, vermiculite, calcium, silicate, aluminum silicate, feldspar powder, acid clay, pyrophyllite clay, sericite, sillimanite, bentonite, glass flake, slate powder, and silane; carbonates such as calcium carbonate, gohun, barium carbonate, magnesium carbonate, and dolomite; sulfates such as baryta powder, precipitated calcium sulfate, calcined plaster, and barium sulfate; hydroxides such as hydrated alumina; oxides such as alumina, antimony oxide, magnesia, titanium oxide, zinc white, silica, silica sand, quartz, white carbon, and diatomaceous earth; sulfides such as molybdenum disulfide; and plate-like wollastonite, and these fillers may be used alone or two or more of these fillers may be used together.

Examples of other granular fillers include calcium carbonate, glass beads, barium sulfate, and titanium oxide, and these fillers may be used alone or two or more of these fillers may be used together.

Further, the liquid crystal polyester resin composition of the present invention may include other additives without impairing the effect of the present invention.

Examples of other additives include lubricants such as higher fatty acids, higher fatty acid esters, higher fatty acid amides, higher fatty acid metal salts (the "higher fatty acid" as used herein means a fatty acid having, for example, from 10 to 25 carbon atoms), mold release improving agents such as polysiloxane and fluororesin, coloring agents such as dyes, pigments, and carbon black, flame retardants, antistatic agents, surfactants, antioxidants such as phosphorus-based antioxidants, phenol-based antioxidants, and sulfur-based antioxidants, weathering agents, thermal stabilizer, and neutralizer. These additives may be used alone or two or more of these additives may be used together.

The content of these other additives is preferably from 0.1 to 10 parts by mass, and more preferably from 0.5 to 5 parts by mass, relative to 100 parts by mass of the liquid crystal polyester. When the content of these other additives is more than 10 parts by mass, molding processability can be lowered or thermal stability can be impaired.

An additive having an outer lubricant effect, such as higher fatty acids, higher fatty acid esters, higher fatty acid metal salts, or fluorocarbon-based surfactants may be adhered to the surface of the pellet of the liquid crystal polyester resin composition in prior to molding the liquid crystal polyester resin composition.

Further, the liquid crystal polyester resin composition of the present invention may include other resin component(s) without impairing intent of the present invention. Examples of other resin components include thermoplastic resins such as polyamides, polyesters, polyacetals, polyphenyleneethers and modified products thereof, polysulfones, polyethersulfones, polyetherimides, and polyamideimides, and thermosetting resins such as phenol resins, epoxy resins, and polyimide resins.

The other resin components may be included alone or two or more of these other resin components may be included together. The content of the other resin components is not especially limited, and may be determined appropriately in accordance with the application and purpose of the liquid crystal polyester-resin composition. Typically, the other resin components are added such that the total content of other resins is preferably from 0.1 to 100 parts by mass, and especially from 0.1 to 80 parts by mass, relative to 100 parts by mass of the liquid crystal polyester.

The liquid crystal polyester resin composition can be obtained by blending the liquid crystal polyester (A), the liquid crystal polyester (B), and glass fibers (C), and optional other inorganic fillers and/or organic fillers, other additives and other resin components to form a predetermined composition, and melt-kneading these materials by using a banbury mixer, a kneader, a single-screw or twin-screw extruder, or the like.

The glass fibers (C), other fillers, other additives, other resin components, and the like may be blended to either or both of the liquid crystal polyester (A) and the liquid crystal polyester (B), or blended to a resin blend including (A) and (B).

The liquid crystal polyester resin composition of the present invention produced as described above is molded or processed by a known molding method using injection-molding machines, extruders, or the like.

The deflection temperature under load (ASTM D648, load: 1.82 MPa) of the liquid crystal polyester resin composition of the present invention, as measured by using strip-like test pieces of the liquid crystal polyester resin composition (length 127 mm, width 12.7 mm, thickness 3.2 mm), is preferably equal to or more than 240° C., more preferably equal to or more than 250° C., still more preferably equal to or more than 260° C., and typically equal to or less than 300° C.

Further, as measured in a bending test by using strip-like test pieces (length 127 mm, width 12.7 ram, thickness 0.5 mm), the bending strength of the liquid crystal polyester resin composition of the present invention is equal to or more than 330 MPa, preferably equal to or more than 335 MPa, and more preferably equal to or more than 340 MPa, and the bending elastic modulus of the liquid crystal polyester resin composition is equal to or more than 20 GPa, preferably equal to or more than 21 GPa, and more preferably equal to or more than 22 GPa. An example of the upper limit value of the above described bending strength is 400 MPa, but not especially limited thereto. Further, an example of the upper limit value of the above described bending elastic modulus is 30 GPa, but not especially limited thereto. Therefore, in the liquid crystal polyester resin, composition of the present invention, the above described bending strength is, for example, from 330 to 400 MPa, from 335 to 400 MPa, or from 340 MPa to 400 MPa, and the above described bending elastic modulus is, for example, from 20 to 30 GPa, from 21 to 30 GPa, and from 22 to 30 GPa.

It is noted that the bending test may be performed according to ASTM D790, except that the thickness of the test piece is 0.5 mm and test speed is set to 8.33 mm/min.

The liquid crystal polyester resin composition of the present invention is excellent in rigidity and strength, and thus suitable for use in electronic components such as connectors, relays, switches, and the like. In particular, the liquid crystal polyester resin composition of the present invention provides outstanding improvement in rigidity and strength, when used in thin walled molded articles having a thickness from 0.1 to 1.0 mm, and thus especially suitable for use as resin materials for housing components (parts) and actuator components (parts) of FPC or FFC connectors.

EXAMPLES

The present invention will be explained below with reference to examples. However, the present invention is not limited to these examples in any way.

In examples, measurement of melt viscosity, deflection temperature under load, bending strength, bending elastic modulus, and crystal melting temperature, and rating in confirmation test for fixation of an actuator component were conducted by using methods described below.

(1) Melt Viscosity

Melt viscosities of liquid crystal polyesters were each measured at a shear rate of 1000 $sec^{-1}$ and at 350° C. (320° C. for LCP-2) by using a melt viscosity measuring apparatus (CAPILOGRAPH ID manufactured by Toyo Seiki Seisaku-sho, Ltd.). In this measurement, 0.7 mm$\phi$×10 mm capillary was used for liquid crystal polyesters of Synthesis Examples, and 1.0 mm$\phi$)×10 mm capillary was used for liquid crystal polyester resin compositions of Examples 1 to 5 and Comparative Examples 1 to 8.

(2) Deflection Temperature Under Load (DTUL)

Each of the liquid crystal polyester resin compositions of Examples and Comparative Examples was formed into a strip-like test piece (length: 127 mm, width: 12.7 mm, thickness: 3.2 mm) by using an injection-molding machine (UH1000-110 manufactured by Nissei Plastic Industrial Co., Ltd.) at a cylinder setting temperature of 350° C. and a mold temperature of 70° C. DTULs for these strip-like test pieces were measured under a load of 1.82 MPa and at a heating rate of 2° C./min according to ASTM D648.

(3) Bending Strength

Strip-like test pieces (length: 127 mm, width: 12.7 mm, thickness: 0.5 mm) were formed by using an injection-molding machine (UH1000-110 manufactured by Nissei Plastic Industrial Co., Ltd.) at a cylinder setting temperature of 350° C. and a mold temperature of 70° C., and used for the bending strength measurement.

The bending strength was measured according to ASTM D790, except that the thickness of the test piece was 0.5 mm and test speed was set to 8.33 mm/min.

(4) Bending Elastic Modulus

The same test pieces as for the bending strength measurement were used in the bending elastic modulus measurement. The test pieces were measured in a similar way to the bending strength measurement.

(5) Crystal Melting Temperature

Liquid crystal polyesters were heated in a differential scanning calorimeter (Exstar 6000, Seiko Instruments Inc.) from room temperature to determine the endothermic peak temperature (Tm1) measured under a heating condition of 20° C./min, After the Tm1 was determined, the samples were held at temperature 20 to 50° C. higher than Tm1 for 10 minutes. Then the samples were cooled to room temperature under a cooling condition of 20° C./min, and the peak top temperature of the exothermic peak observed during the cooling was recorded as the crystallization temperature (Tc) of the liquid crystal polyester. Further, the endothermic peak was measured again under a heating condition of 20° C./min, and the temperature indicated by the peak top was defined as the crystal melting temperature (Tm) of the liquid crystal polyester.

(6) Confirmation Test for Fixation of Actuator Component

A test piece used in the Confirmation test for fixation is illustrated in FIG. 1.

A housing component 2 and an actuator component 3 (30 mm×1 mm×0.5 mm substantially strip-like piece) were each formed by using an injection-molding machine (UH1000-110 manufactured by Nissei Plastic Industrial Co., Ltd.) at a cylinder setting temperature of 350° C. and a mold temperature of 70° C., and combined to form a test piece 1.

Figure 2:
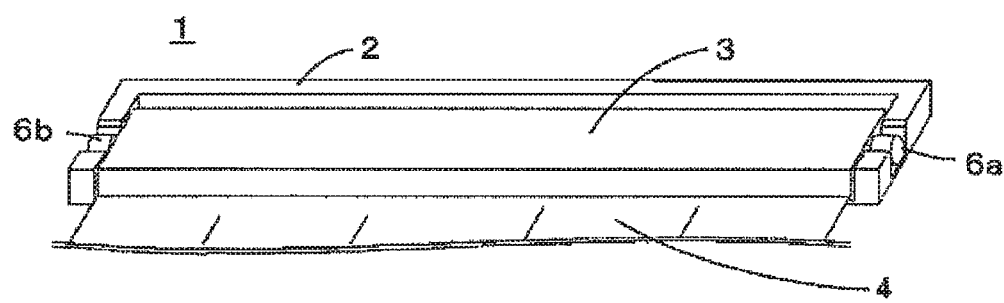
FIG. 2 shows a schematic diagram illustrating a test piece used in the confirmation test for fixation of an actuator component, with the actuator component in a locked position.

Then, a flat cable 4 (thickness: 0.3 mm) was placed in an opening portion of the test piece 1, as illustrated in FIG. 2, and a pressing force was applied to only an area adjacent to a fixing part 6a, which is one of fixing parts 6a and 6b provided on the opposed ends of the actuator component 3, such that the fixing part 6a was moved until the fixing part 6a was locked in the lock part 7a of the housing component 2 whereby the flat cable 4 came into contact with contacts 5 in a pressed This operation was repeated until the fixing part 6b, which is the other fixing part in the actuator component 3, was no longer locked in the lock part 7b, and the number of repetitions was counted and rated as shown in Table 1.

TABLE 1

| 3 or more | Good |
|---|---|
| 1 or 2 | Marginal |
| 0 | Poor |

Synthesis examples of the liquid crystal polyester used in the Examples and Comparative Examples will be described below. Abbreviations for names of compounds in the Synthesis Example are as follows.
[Monomers Used for Synthesizing Liquid Crystal Polyester]
POB: 4-hydroxybenzoic acid
BON6: 6-hydroxy-2-naphthoic acid
BP: 4,4'-dihydroxybiphenyl
HQ: Hydroquinone
TPA: Terephthalic acid Synthesis Example 1 (LCP-1)

BON 6: 660.5 g (54.0% by mol), BP: 254.2 g (21.0% by mol), HQ: 14.3 g (2.0% by mol), and TPA: 248.3 g (23.0% by mol) were put in a reaction vessel with a stirrer equipped with a torque meter and a distillation tube, and then acetic anhydride was added in a molar quantity that is 1.03 times the molar quantity of the hydroxyl groups of the overall monomers. The mixture was subjected to deacetation polymerization under the following conditions.

The mixture was heated from room temperature to 150° C. in 1 hour in a nitrogen gas atmosphere, and held at 150° C. for 60 minutes. Then, the mixture was heated to 350° C. in 7 hours while distilling off acetic acid which is a byproduct, and then the pressure was reduced to 10 mmHg in 90 minutes. The polymerization was terminated when predetermined torque was observed. The content was taken out from the reaction vessel, and processed by using a pulverizer to obtain liquid crystal polyester pellets. The amount of acetic acid distilled during the polymerization was approximately equal to a theoretical value. The crystal melting temperature (Tm) and melt viscosity of the resulting pellet were 338° C. and 23 Pa·s, respectively.

Synthesis Example 2 (LCP-2)

POB: 655.4 g (73% by mol) and BON6: 330.2 g (27% by mol) were put in a reaction vessel with a stirrer equipped with a torque meter and a distillation tube, and then acetic anhydride was added in a molar quantity that is 1.02 times the molar quantity of the hydroxyl groups of the overall monomers. The mixture was subjected to deacetation polymerization under the following conditions.

The mixture was heated from room temperature to 145° C. in 1 hour in a nitrogen gas atmosphere, and held at 145° C. for 30 minutes. Then, the mixture was heated to 320° C. in 7 hours while distilling off acetic acid which is a byproduct, and then the pressure was reduced to 10 mmHg in 80 minutes. The polymerization was terminated when predetermined torque was observed. The content was taken out from the reaction vessel, and processed by using a pulverizer to obtain liquid crystal polyester pellets. The amount of acetic acid distilled during the polymerization was approximately equal to a theoretical value. The crystal melting temperature (Tm) and melt viscosity of the resulting pellet were 279° C. and 21 Pa·s, respectively.

Synthesis Example 3 (LCP-3)

POB: 323.2 g (36% by mol), BON 6: 48.9 g (4% by mol), BP: 169.4 g (14% by mol), HQ: 114.5 g (16% by mol) and TPA: 323.9 g (30% by mol) were put in a reaction vessel with a stirrer equipped with a torque meter and a distillation tube, and then acetic anhydride was added in a molar quantity that is 1.03 times the molar quantity of the hydroxyl groups of the overall monomers. The mixture was subjected to deacetation polymerization under the following conditions.

The mixture was heated from room temperature to 145° C. in 1 hour in a nitrogen gas atmosphere, and held at 145° C. for 30 minutes. Then, the mixture was heated to 350° C. in 7 hours while distilling off acetic acid which is a byproduct, and then the pressure was reduced to 5 mmHg in 80 minutes. The polymerization was terminated when predetermined torque was observed. The content was taken out from the reaction vessel, and processed by using a pulverizer to obtain liquid crystal polyester pellets. The amount of acetic acid distilled during the polymerization was approximately equal to a theoretical value. The crystal melting temperature (Tm) and melt viscosity of the resulting pellet were 335° C. and 20 Pa·s, respectively.

Fillers used in the following Examples and Comparative Examples are as follows.
Glass Fiber
GF-1: ECS03T-747H from Nippon Electric Glass Co., Ltd. (number average fiber diameter: 10.5 μm, number average fiber length: 3 mm, surface treated by epoxy resin sizing agent and silane-based coupling agent)
GF-2: ECS03T-790DE from Nippon Electric Glass Co., Ltd. (number average fiber diameter: 6.5 μm, number average fiber length: 3 mm, surface treated by epoxy resin sizing agent and silane-based coupling agent)
GF-3: CS3J256 from Nitto Boseki Co., Ltd. (number average fiber diameter: 10 μm, number average fiber length: 3 mm, surface treated by urethane resin sizing agent and silane-based coupling agent)
Mica
Mica: AB-25S from Yamaguchi MICA Co., Ltd. (particle size: 22 μm)

Example 1

70 parts by mass of LCP-1, which is the liquid crystal polyester (A), 30 parts by mass of LCP-2, which is the liquid crystal polyester (B), and 43 parts by mass of GF-1 were blended. The resulting mixture was melt-kneaded at 350° C. by using a twin-screw extruder (TEX-30 manufactured by The Japan Steel Works, Ltd.), and pellets of the liquid crystal polyester resin composition were produced. Measurement of melt viscosity, deflection temperature under load, bending strength, and bending elastic modulus, and rating in confirmation test for fixation of an actuator component were conducted by using the above described methods. The results are shown in Table 2.

Examples 2 to 5 and Comparative Examples 1 to 7

LCP-1 to 3, GF-1 to 3, and mica were blended according to the contents shown in Table 2, these blends were pelletized in much the same way as Example 1 (melt-kneading for Comparative Example 2 was performed at 300° C.), and measurement and rating for the samples were performed according to the above described method. The results are shown in Table 2.

As shown in Table 2, all the liquid crystal polyester resin compositions of the present invention (Examples 1 to 5) gave DTUL equal to or more than 240° C., bending strength equal to or more than 330 MPa, and bending elastic modulus equal to or more than 20 GPa, and excellent results in the confirmation test for fixation of the actuator component.

In contrast, the samples which did not have technical features of the present invention (i.e., Comparative Examples 1 to 7) gave insufficient bending strength, insufficient bending elastic modulus, or poor balance between bending strength and bending elastic modulus, and poor results in rating in the confirmation test for fixation of the actuator component.

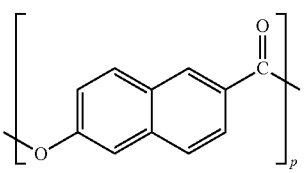

(I)

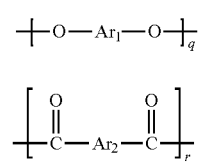

(II)

(III)

wherein each of $Ar_1$ and $Ar_2$ represents one or more divalent aromatic groups, and p, q, and r are molar percentages of the respective repeating units in the liquid crystal polyester (A) and satisfy the following condition,

TABLE 2

|  |  | Examples | | | | | Comparative Examples | | | | | | |
| --- | --- | --- | --- | --- | --- | --- | --- | --- | --- | --- | --- | --- | --- |
|  |  | 1 | 2 | 3 | 4 | 5 | 1 | 2 | 3 | 4 | 5 | 6 | 7 |
| LCP (parts by mass) | LCP-1 | 70 | 85 | 70 | 70 | 50 | 95 | 30 | 70 | 70 | 70 | — | 70 |
|  | LCP-2 | 30 | 15 | 30 | 30 | 50 | 5 | 70 | 30 | 30 | 30 | 30 | 30 |
|  | LCP-3 | — | — | — | — | — | — | — | — | — | — | 70 | — |
| Glass fiber (parts by mass) | GF-1 | 43 | 43 | 67 | — | 43 | 43 | 43 | 7 | 150 | — | 43 | — |
|  | GF-2 | — | — | — | 43 | — | — | — | — | — | — | — | — |
|  | GF-3 | — | — | — | — | — | — | — | — | — | 43 | — | — |
| Mica (parts by mass) |  | — | — | — | — | — | — | — | — | — | — | — | 43 |
| Properties | Melt viscosity (Pa · s) | 32 | 33 | 35 | 32 | 29 | 35 | 25 | 24 | 50 | 32 | 25 | 30 |
|  | DTUL (° C.) | 287 | 290 | 285 | 287 | 280 | 295 | 225 | 277 | 288 | 286 | 235 | 234 |
|  | Bending strength (MPa) | 349 | 340 | 363 | 349 | 342 | 325 | 320 | 296 | 311 | 325 | 321 | 251 |
|  | Bending elastic modulus (GPa) | 21 | 24 | 25 | 21 | 21 | 24 | 15 | 18 | 25 | 19 | 18 | 13 |
|  | Confirmation test for fixation of an actuator component | Good | Good | Good | Good | Good | Poor | Marginal | Marainal | Poor | Poor | Poor | Poor |

REFERENCE SIGNS LIST

1: Test piece

2: Housing component (part)

3: Actuator component, (part)

4: Flat cable

5: Contact

6a, 6b: Fixing part

7a, 7b: Lock part

What is claimed is:

1. A liquid crystal polyester resin composition, comprising:
    a liquid crystal polyester (A) consisting of repeating units represented by formulae (I) to (III), $35 \leq p \leq 90$ $5 \leq q \leq 30$, and $5 \leq r \leq 30$;

a liquid crystal polyester (B) including repeating units represented by formulae (IV) and (V),

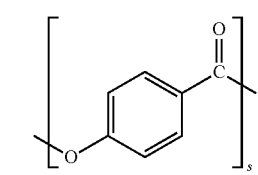

(IV)

-continued

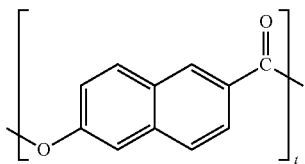

wherein
s and t are molar percentages of the respective repeating units in the liquid crystal polyester (B) and satisfy the following condition, $80/20 \leq s/t \leq 60/40$; and surface-treated glass fibers (C) including an epoxy resin on the surface thereof, wherein
the mass ratio of (A) to (B) [A/B] is from 90/10 to 45/55,
the content of (C) is from 10 to 130 parts by mass relative to 100 parts by mass of the total amount of (A) and (B), and
as measured in a bending test using a molded article which is a strip having a length of 127 mm, width of 12.7 mm, and thickness of 0.5 mm, the bending strength and the bending elastic modulus of the liquid crystal polyester resin composition are equal to or more than 330 MPa and equal to or more than 20 GPa, respectively.

2. The liquid crystal polyester resin composition according to claim 1, wherein
the liquid crystal polyester resin composition has a deflection temperature under a load of 1.82 MPa according to ASTM D648 which is equal to or more than 240° C.

3. A molded article composed of the liquid crystal polyester resin composition according to claim 1.

4. A molded article composed of the liquid crystal polyester resin composition according to claim 2.

5. The molded article according to claim 3, wherein
the molded article is an actuator component or a housing component of a FPC or FFC connector.

6. The molded article according to claim 4, wherein
the molded article is an actuator component or a housing component of a FPC or FFC connector.

* * * * *